United States Patent [19]

Madsen et al.

[11] 4,202,859

[45] May 13, 1980

[54] CRYSTALLIZER

[75] Inventors: Rud F. Madsen, Nakskov; Jens H. Jensen, Hørsholm; Jens C. Engvad, Assens, all of Denmark

[73] Assignee: Aktieselskabet de Danske Sukkerfabrikker, Copenhagen, Denmark

[21] Appl. No.: 837,469

[22] Filed: Sep. 27, 1977

[30] Foreign Application Priority Data

Sep. 28, 1976 [DK] Denmark .................... 4359/76

[51] Int. Cl.² ............................................. B01D 9/02
[52] U.S. Cl. .................................... 422/245; 127/16; 62/544
[58] Field of Search ............... 127/16; 23/273 R; 62/544, 545; 422/245

[56] References Cited

U.S. PATENT DOCUMENTS

| | | | |
|---|---|---|---|
| 1,409,607 | 3/1922 | Stevens | 23/273 R |
| 3,681,932 | 8/1972 | Huber et al. | 62/544 |
| 3,770,386 | 11/1973 | Hayashi | 62/544 |
| 3,902,855 | 9/1975 | Lynch | 62/544 |

OTHER PUBLICATIONS

Principles of Sugar Technology—Honig VII, 1959, Elsevier Pub. 466–470.

*Primary Examiner*—Hiram H. Bernstein
*Attorney, Agent, or Firm*—Watson, Cole, Grindle & Watson

[57] ABSTRACT

A crystallizer which comprises a vertically mounted elongated container that contains at least one bundle of spaced cooling pipes extending longitudinally of the container and a wing attached to a shaft extending longitudinally of the container, the shaft being rotated so as to oscillate about its axis and thus force crystallizable liquid forwards and backwards through the spaces between the cooling pipes to cool the liquid and thus cause a crystallization thereof.

6 Claims, 2 Drawing Figures

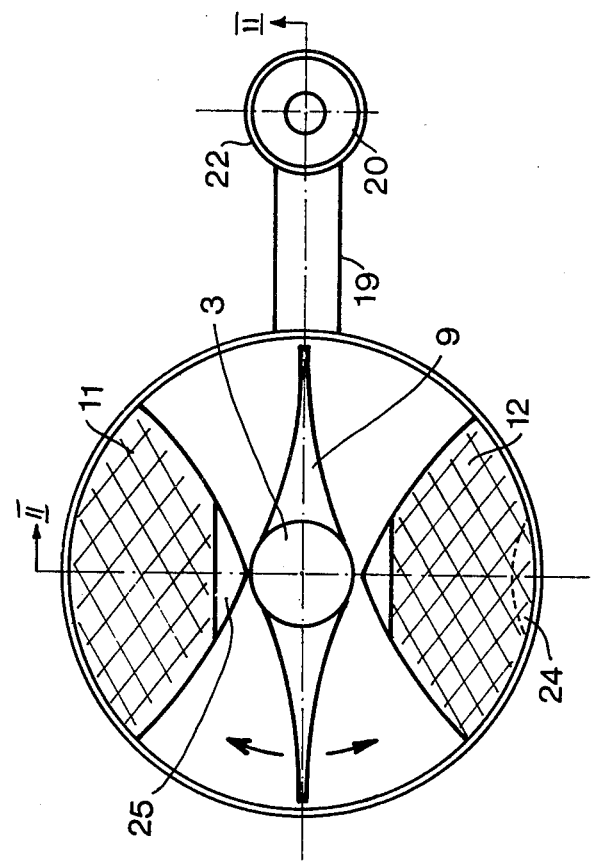

4,202,859

CRYSTALLIZER

BACKGROUND OF THE INVENTION

This invention relates to a crystallizer comprising an elongated container adapted to hold a crystallizable liquid and provided with cooling elements, and means for causing the crystallizable liquid and the cooling elements to move relative to one another. In particular, the invention relates to a crystallizer for effecting a crystallization of sugar from a supersaturated sugar juice.

In the production of crystalline sugar from sugar juice, the latter is introduced into a boiler in which it is evaporated so as to form a so-called massecuite consisting of supersaturated sugar solution and crystal seeds. The massecuite thus formed is then transferred to a crystallizer comprising cooling elements. During cooling in such a crystallizer, the massecuite is subjected to a movement relative to the cooling elements so as to facilitate the transfer of heat from the massecuite to the cooling elements.

A prior art crystallizer of the above-mentioned type comprises a trough provided with a stirrer having disc-shaped cooling plates connected with means for continuously passing brine through the cooling plates.

Another prior art crystallizer comprises a drum which is rotatable about a horizontal axis, and a plurality of stationary cooling pipes extending through the drum and being fixed to stationary end plates of the drum.

These prior art crystallizers are not fully satisfactory because high forces and a heavy construction are required to generate a satisfactory movement of the massecuite relative to the cooling elements. Therefore, both the initial costs and the operational costs of such crystallizers are high.

The object of the invention is to provide a crystallizer wherein the movement of the liquid to be crystallized relative to the cooling elements is effected in a simple and inexpensive manner.

SUMMARY OF THE INVENTION

The crystallizer of the invention comprises an elongated container adapted to hold a crystallizable liquid, cooling elements in the form of at least one bundle of stationary spaced cooling pipes extending longitudinally of the container, means for passing coolant through the cooling pipes and at least one wing extending longitudinally of and being attached to a shaft extending longitudinally of the container, said shaft being connected to means for effecting an oscillating movement of the shaft so as to force the crystallizable liquid through the spaces between the cooling pipes and to generate a crystallization thereof. The operation of the crystallizer of the invention comprises the steps of introducing the crystallizable liquid into the container and continuously passing cooling liquid through the bundle of cooling pipes while subjecting the shaft and the wing attached thereto to an oscillating movement. During this oscillating movement, which can be generated by simple means, e.g. a set of hydraulic cylinders, the crystallizable liquid is forced forwards and backwards through the spaces between the cooling pipes while being cooled.

By providing the inlet for crystallizable liquid at one end of the enlongated container and the outlet for crystallized mass at the opposite end, the liquid medium will follow a path extending both transversely to and longitudinally of the cooling pipes. Consequently, a very effective heat transfer is obtained.

In a preferred embodiment of the crystallizer of the invention the elongated container is mounted substantially vertically and the inlet for crystallizable liquid is provided at the upper end of the container, whereas the outlet for crystallized mass is provided at one lower end of the container. In such a crystallizer the liquid medium has a natural tendency to flow from the inlet opening towards the outlet opening because of the fact that the density of the liquid medium increases as the crystallization proceeds. Furthermore, due to the vertical mounting of the shaft supporting the wing, the bearings for the ends of the shaft may be of a simple construction. The vertical mounting of the shaft also reduces the forces required to generate the oscillating movement.

A further advantage of the embodiment in which the elongated container is mounted substantially vertically is that it requires a relatively small floor space.

In a further preferred embodiment of the invention two diametrically opposite wings are attached to the shaft and the crystallizer comprises two bundles of pipes, said bundles being mounted at diametrically opposite sides of the container.

By providing two wings and two bundles of cooling pipes within the container, the frequency of the movement forwards and backwards through the spaces between the pipes of each bundle and thus also the efficiency of the heat transfer can be considerably increased. Furthermore, due to the symmetrical mounting of the wings relative to the shaft, simpler bearings for supporting the ends of the shaft can be used.

The contour of the part of each bundle of cooling pipes which faces the adjacent wing is preferably adjusted to the contour of the adjacent part of the wing so as to permit the wing to be moved into a position in close proximity of the bundle of pipes and so as to force the whole liquid mass into the spaces between the pipes.

In a still further preferred embodiment of the crystallizer of the invention each bundle of cooling pipes comprises spaced division plates extending substantially transversely of the pipes, each division plate having an opening therein, the openings in two adjacent division plates within each bundle of pipes being offset relative to one another.

Thus, the opening in one division plate is preferably provided in proximity of the inner wall of the container whereas the opening provided in the adjacent division plate is provided in proximity of the shaft. By providing such division plates in each bundle of pipes, the liquid medium is forced to follow a zig-zag shaped path during its movement from one end of the container towards the opposite end thereof and the liquid is prevented from flowing directly from one end to the other.

Each wing may be divided into sections, e.g. four sections, each extending over part of the length of the container. When using the crystallizer of the invention for effecting a crystallization of massecuite, the latter is typically introduced into the crystallizer heated to a temperature of about 75° C. Due to the efficient cooling obtained, the temperature of the liquid medium leaving the crystallizer may be reduced to about 40° C. by pumping ordinary cooling water through the cooling pipes. In certain cases it may be sufficient to effect the cooling with atmospheric air passing through the cooling pipes.

In case a more severe cooling is required, coolants having a lower temperature, e.g. brine, are used.

BRIEF DESCRIPTION OF THE DRAWINGS

FIG. 2 shows a cross-sectional view of the crystallizer shown in FIG. 1 along with the line I—I.

DESCRIPTION OF THE PREFERRED EMBODIMENTS

Figure 1:
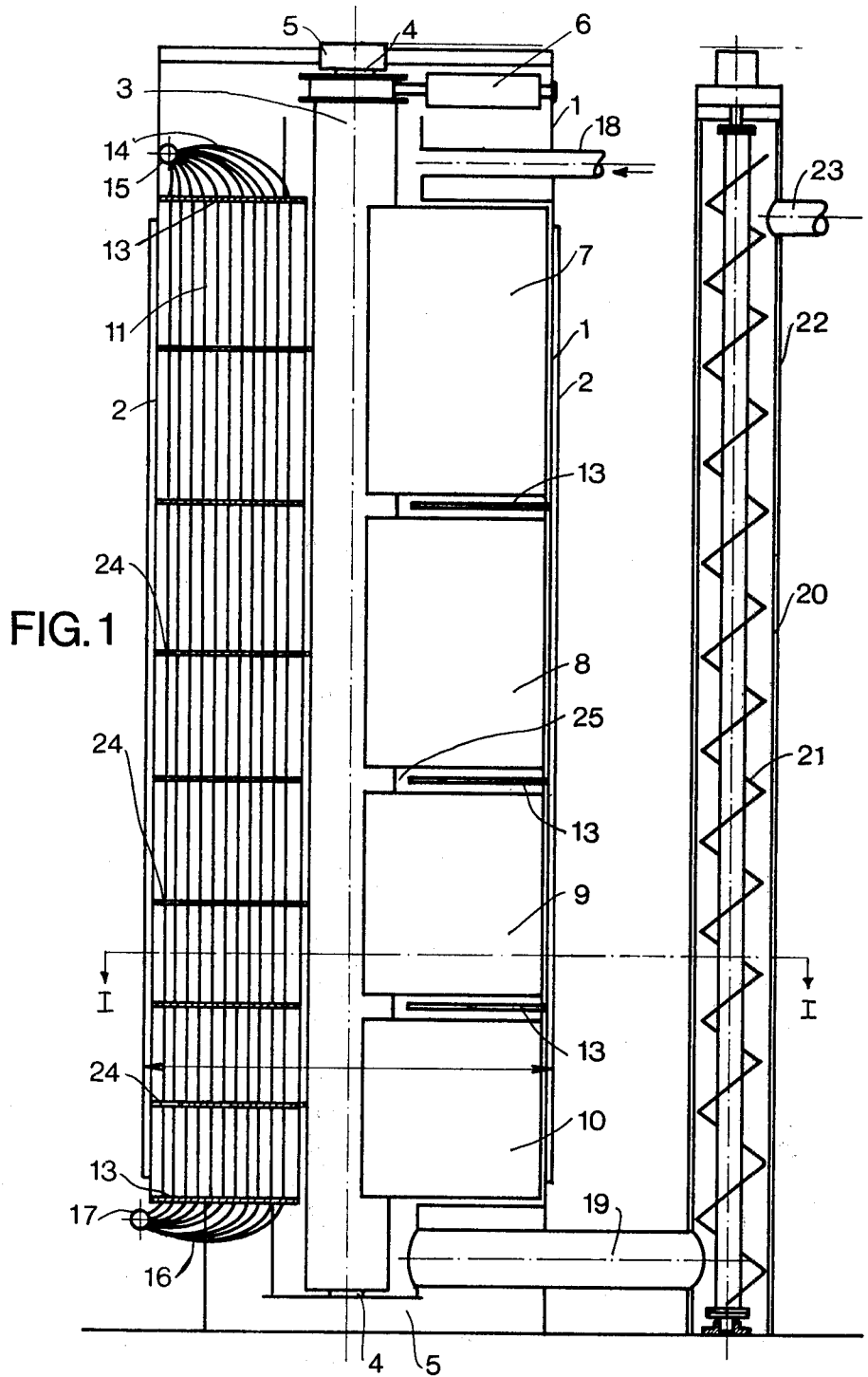
FIG. 1 shows a sectional view through a preferred embodiment of the crystallizer of the invention along the line II—II of FIG. 2.

In the drawings 1 is a vertical circular cylindrical container surrounded by an external cooling jacket 2. A shaft 3 having ends provided with journals 3 mounted in bearings 5 is mounted within the container 1. The shaft 3 is connected to two hydraulic cylinders 6 (only one is shown in the drawings) adapted to subject the shaft 3 to an oscillating movement about its axis. Four axially and radially extending wing sections 7, 8, 9 and 10 are welded to diametrically opposite sides of the shaft 3, the outer edges of the wing sections terminating in proximity of the inside of the container 1. The crystallizer also comprises two bundles of cooling pipes, each comprising a plurality of spaced pipes. The pipes which extend through division plates 13 located at different levels within the container 1 are connected to tubes 14 at their upper ends. The tubes 14 connect the cooling pipes with a manifold 15 which is connected to a source (not shown) for coolant, e.g. cooling water. The lower ends of the cooling pipes are connected to tubes 16 which in turn are connected to a manifold 17. The manifold 17 is connected to means (not shown) for discharging coolant.

The crystallizer shown also comprises an inlet pipe 18 for crystallizable liquid, the pipe 18 being mounted at the top of the container 1 and a discharge pipe 19 mounted at the bottom of the container 1 and connected to a vertically mounted pipe 20 surrounding a screw conveyor 21. The pipe 20 is surrounded by a heating jacket 22. A discharge pipe 23 is provided at the upper end of the pipe 20.

In the crystallizer illustrated, every second division plate 13 has an opening 24 located in proximity of the inside of the container 1. The remaining division plates 13 terminate at some distance from the shaft 3 so as to form openings 25 between the shaft 3 and the inner edges of the division plates 13.

The operation of the crystallizer illustrated is as follows.

While introducing crystallizable liquid into the container 1 through the inlet pipe 18 and optionally passing coolant through the jacket 2, coolant is passed from the manifold 13 into the tubes 14 and subsequently into the upper ends of the cooling pipes of the bundles 11 and 12. The coolant thus introduced passes down through the cooling pipes and is discharged at the bottom of the container 1 through the tubes 16 and the manifold 17.

By activation of the hydraulic cylinders the shaft 3 and the wing sections 7, 8, 9 and 10 attached thereto are caused to oscillate about the axis of the shaft 3. Due to this oscillating movement the crystallizable liquid is forced forwards and backwards through the spaces between the cooling pipes of the two bundles 11 and 12.

As a result of the contact between the crystallizable liquid and the cooling pipes, the liquid is cooled and the liquid crystallizes. Due to the decreasing temperature and the increasing concentration of crystals, the density of the liquid mass increases. Consequently, the mass tends to move towards the bottom of the container 1 during the forced movement through the spaces between the cooling pipes.

Since the openings 24 and 25 are offset relative to one another, the mass under crystallization will follow a zig-zag shaped path under its movement through the crystallizer and consequently an efficient cooling is ensured. Furthermore, the provision of openings which are offset relative to one another, also prevents the crystallizable liquid from flowing directly from the upper end to the lower end of the container 1.

When the mass formed reaches the bottom of the container 1, it has a high concentration of crystals.

Before the crystals are separated from the mother liquid, e.g. by using a centrifuge, the mass formed is raised through the pipe 20 in which it is heated by means of a heating medium introduced into the jacket 22 so as to facilitate the subsequent separation of crystals.

We claim:

1. A crystallizer comprising an elongated container adapted to hold a crystallizable liquid, cooling elements in the form of at least one bundle of stationary spaced cooling pipes extending longitudinally of and within said container, means for passing coolant through said cooling pipes, a shaft extending longitudinally of and within said container, and at least one wing extending longitudinally of and being attached to said shaft, said shaft being connected to means for effecting an oscillating movement of said shaft so that said at least one wing forces the crystallizable liquid through the spaces between and along the surfaces of said cooling pipes to generate a crystallization thereof.

2. A crystallizer as in claim 1, when said container includes an inlet means for entrance of crystallizable liquid at one end of the elongated container and an outlet means for exit of crystallized mass at its opposite end.

3. A crystallizer as in claim 1, including means for mounting said elongated container substantially vertically.

4. A crystallizer as in claim 1, wherein two diametrically opposite wings are attached to said shaft and wherein the container includes therein two bundles of spaced cooling pipes, said bundles of pipes being mounted at diametrically opposite sides of said container.

5. A crystallizer as in claim 1, wherein the contour of the part of each bundle of cooling pipes facing the adjacent wing is adjusted to the contour of the adjacent part of said wing.

6. A crystallizer as in claim 1, wherein each bundle of cooling pipes comprises spaced division plates extending substantially transversely to said pipes, each division plate having an opening therein and wherein the openings in two adjacent division plates within each bundle of cooling pipes are offset relative to one another.

* * * * *